Feb. 18, 1941. C. SAURER 2,232,667
RESILIENT MOUNTING
Filed Sept. 23, 1939 2 Sheets-Sheet 1
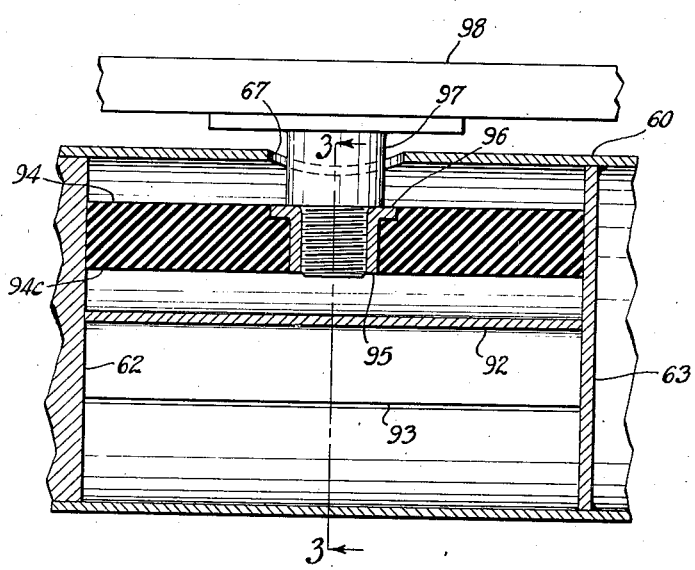
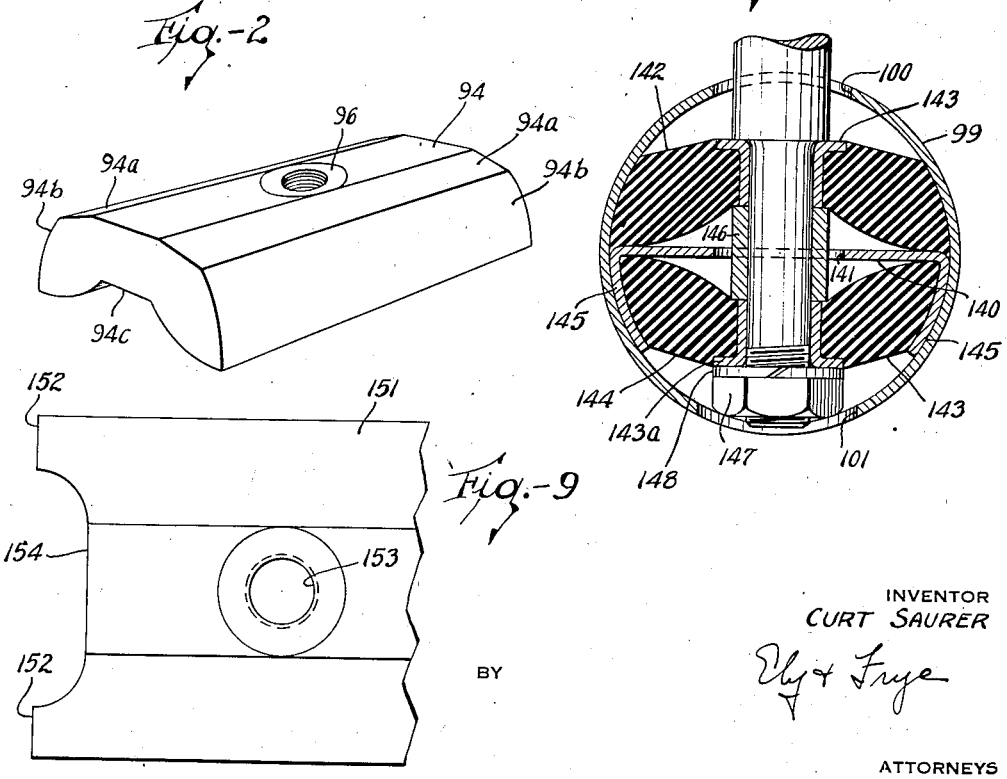
INVENTOR
CURT SAURER
ATTORNEYS Feb. 18, 1941.　　　　C. SAURER　　　　2,232,667
RESILIENT MOUNTING
Filed Sept. 23, 1939　　　2 Sheets-Sheet 2

INVENTOR
CURT SAURER

ATTORNEYS

Patented Feb. 18, 1941

2,232,667

UNITED STATES PATENT OFFICE 2,232,667

RESILIENT MOUNTING

Curt Saurer, Akron, Ohio, assignor to The Firestone Tire & Rubber Company, Akron, Ohio, a corporation of Ohio Application September 23, 1939, Serial No. 296,275
In Canada May 13, 1939

13 Claims. (Cl. 248—358)

This invention relates to resilient mountings, and more especially it relates to yielding structures that may be interposed between two bodies, of which one body at least is a vibratory body, for suppressing the translation of vibration between said bodies.

The improved mounting is especially adapted for use in motor vehicles, and may be used between the motor or engine and its supporting structure, or between the longitudinal and the transverse members of the frame or the body of the vehicle.

The chief objects of the invention are to provide an improved resilient mounting of the character mentioned; and to provide a resilient mounting that may be mounted in a number of different ways to control relative movement between two bodies in one or more directions, while enabling substantial freedom of movement in other directions. Other objects will be manifest as the specification proceeds.

The invention will be described with particular reference to the accompanying drawings, in which:

Figure 1 is a longitudinal section of one embodiment of the invention in operative association with a supporting and a supported structure;

Figure 2 is a perspective view of the resilient element of the mounting;

Figure 3:
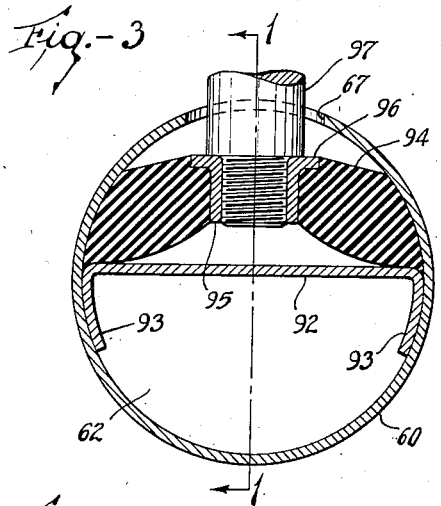
Figure 3 is a section on the line 3—3 of Figure 1.

Figures 4 to 8, inclusive, are respective transverse sections of other embodiments of the invention, including separate resilient structures for opposing rebound; and Figure 9 is a fragmentary plan of a modified type of resilient element.

This application is a continuation-in-part of my copending application Serial No. 254,191, filed February 2, 1939.

Referring specifically to the embodiment of the invention shown in Figure 1, it comprises a hollow supporting member 60, usually circular in section, having an aperture 67 in the top thereof. The mounting is positioned interiorly of the member 60, between transverse partitions 62, 63 that are fixedly mounted in the member 60 in abutting relation to the ends of the mounting. The mounting comprises a metal abutment plate 92 that is mounted in the tubular member 60, substantially diametrically thereof in a horizontal plane beneath the aperture 67, said plate being formed with downwardly turned arcuate flanges 93, 93 on its lateral margins by means of which the plate may be permanently secured in place, as by welding to the member 60. Mounted within the latter, above plate 92, is a flat-topped, bridge-like structure 94 of resilient rubber composition extending from one side of the tubular structure to the other. Molded into the rubber structure 94 is an internally threaded tubular metal bushing 95 that has a radial flange 96 at its upper end, the top of said flange being flush with the top of structure 94. The flat top face of structure 94 merges with flat side portions 94a which connect to portions 94b which slope downwardly sharply on each side of the structure to the lateral margins thereof, the bottom face 94c of the structure being formed with a flat center strip which terminates in two convex faces that extend each way from the edges of the center portion of the structure to its lateral margins. For connecting this mounting to a supported member 98, a stud 97 is provided, which stud extends through aperture 67 of member 60, the lower end portion of said stud being of reduced diameter and being threaded into bushing 95.

The arrangement is such that lateral movement of the stud 97 in any direction is yieldingly resisted by the resistance to tension and compression of the rubber structure 94, which may originally be compressed slightly, if desired, by the plates 62, 63. Downward movement of the stud is resisted by the resistance to compression of the rubber, and said resistance progressively increases as greater areas of the convex bottom surfaces of the rubber structure progressively come into contact with the plate 92. Rebound of the supported member characterized by upward movement of the stud 97 relatively of the mounting is resisted solely by the tension of the rubber structure.

Figure 4:
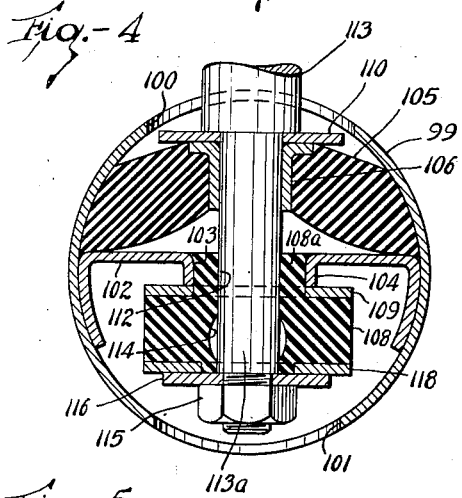

The embodiment of the invention shown in Figure 4 is very similar to that shown in Figure 1, but in addition includes separate means for opposing upward movement of the supported member by compression-resisting rubber. In this figure the tubular body structure 99 is substantially similar to the structure 60 previously described, but is provided with two apertures, designated 100, 101 that are disposed in axial alignment at the top and bottom of the structure respectively. Mounted interiorly of the tube 99 is a substantially diametric, horizontal abutment plate 102 that is similar to abutment plate 92 except that it is formed with a central aperture 103, the latter being co-axial with relation to apertures 100, 101, and having a downwardly projecting peripheral flange 104 thereabout. Above the plate 102 is a bridge-like resilient rubber cushion 105 that is identical with the cushion 94 of Figure 13, said cushion having a tubular metal bushing 106 molded thereinto, which bushing is similar to bushing 95 except that it is not internally threaded.

Mounted below the plate 102 is a rebound-cushioning structure comprising a generally cylindrical rubber body 108 having axially apertured metal plates 109, 110 bonded to the upper and lower ends thereof. The upper end-plate 109 abuts the lower margin of the flange 104. The inside diameter of said plate 109 is the same as that of aperture 103, and a cylindrical axial extension 108a of rubber structure 108 extends through plate 109 and snugly fits within said flange 104. Rubber structure 108 and its extension 108a are formed with an axial aperture 112 of the same diameter as the inside diameter of bushing 106, and receive the reduced lower end portion 113a of a stud 113, the latter bearing against a pressure distributing washer 110 which is carried by the upper end of bushing 106. The stud 113 extends upwardly from the tubular member 99 through aperture 100, said stud constituting a support for a supported structure (not shown) positioned above the structure 99. Interiorly the rubber cushion 108 is formed with a recess 114 opening into axial aperture 112, said recess enabling displacement of adjacent regions of the cushion under compressive load. The rubber of structure 108 extends through the axial aperture of lower end plate 110 and is flush with the bottom face thereof. The lower end of reduced portion 113a of stud 113 is further reduced, and threaded to receive a nut 115, a washer 116 being positioned between said nut and plate 110. The nut 115 is inserted and thereby accessible through aperture 101, and by setting up said nut until it abuts the shoulder formed on the stud 113 at the upper end of the threaded portion thereof, a determinate initial compressive stress may be imposed upon the rubber structures 105 and 108.

In this embodiment of the invention the upward movement of the stud 113 is yieldingly opposed by the resistance to compression of the rubber structure 108, the stud 113 sliding relatively of bushing 106 during such movement. Lateral movement of the stud 113 is resisted both by the rubber structure 105 and portion 108a of the rubber structure 108, both being subjected to compressive stress as the result of such movement. Downward movement of the stud is resisted solely by the rubber cushion 105. Note that the washer 110 will contact greater areas of the cushion 105 as it is flattened under load.

Figure 5:
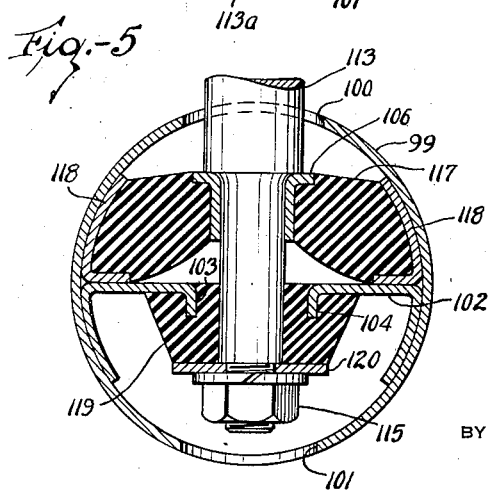

The embodiment of the invention shown in Figure 5 utilizes the body structure 99 of Figure 4, including the apertures 100 and 101, and the horizontal, diametric abutment plate 102 interiorly thereof. Above the plate 102 is a bridge-like resilient rubber structure 117 that is similar to structure 105 in that it includes a centrally positioned metal bushing 106. Opposite lateral marginal faces of the structure 117 are bonded to respective longitudinally extending, metal, surface plates 118, 118 that are transversely arcuate to conform to the curvature of the wall of the body structure 99, the lower marginal portion of each plate 118 being inturned so as to underlie a portion of the structure 117, in face to face relation with abutment plate 102. Vulcanized to the under side of the abutment plate 102 is a frusto-conical body of resilient rubber 119 that is disposed concentrically of the axis of aperture 103 of said plate, and extends through said aperture, the top of the rubber body being flush with the top of the abutment plate and the flange 104 being completely embedded in the rubber. The small diameter of the rubber cushion 119 is at the bottom thereof, and a metal washer 120 is vulcanized to the bottom face of the structure. The cushion is axially apertured to receive the reduced lower end portion of a stud 113 that is identical with the stud utilized in the mounting of Figure 4. The axial aperture of the rubber cushion 119 is larger than the inside diameter of the washer 120, so that the shoulder adjacent the lower end of stud 113 will engage said washer. The nut 115 on the lower end of stud 113 retains the latter in operative engagement with the two rubber structures. The operation of this embodiment of the invention is identical with that shown in Figure 4.

Figure 6:
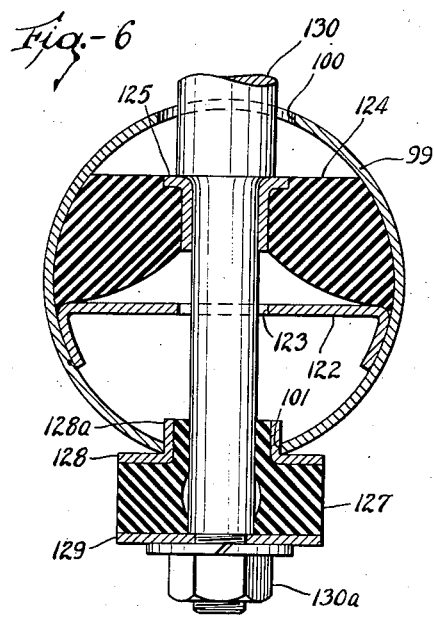

The embodiment of the invention shown in Figure 6 utilizes the body structure 99 of Figures 4 and 5, including the aligned apertures 100, 101 therein. There is a horizontal metal abutment plate 122 extending across the body 99 interiorly thereof and somewhat below its longitudinal axis, said plate being formed with an aperture 123 in axial alignment with apertures 100, 101. Mounted above the plate 122 is a resilient rubber cushion 124 that is similar to cushion 105 previously described, except that the top face of the cushion may be in a horizontal plane. There is a flanged cushion 125 molded into the structure 124 in axial alignment with apertures 100, 101, and 123.

For cushioning rebound, a separate resilient structure is mounted exteriorly of the tubular body 99, said structure comprising a generally cylindrical rubber cushion 127 having axially apertured metal plates 128, 129 bonded to opposite ends thereof. The plate 128 has an axially extending flange 128a about its inner circumference, which flange extends through aperture 101 of the tubular body 99. The rubber structure 127 extends within the flange 128a and is flush with the outer or upper end thereof. Said rubber structure is axially apertured to receive the reduced lower end portion of a stud 130 that is associated with both resilient structures in the same manner as stud 113 of Figures 4 and 5, a nut 130a holding the stud in engagement with the rubber structures, which may be compressed initially, if desired. The stud 130 carries a supported structure (not shown), the arrangement being such that relative movement between the supporting structure and supported structure is yieldingly opposed by the resilient mounting in the same manner as in the embodiments shown in Figures 4 and 5.

Figure 7:
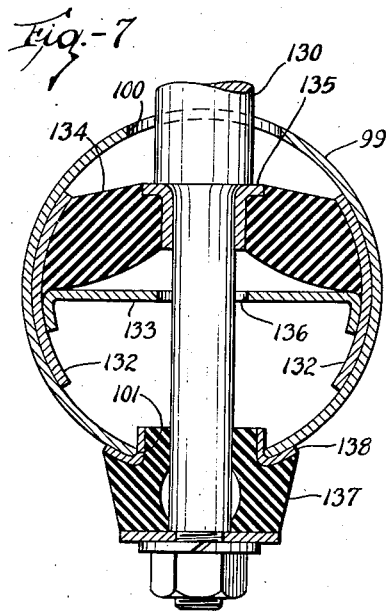

The embodiment of the invention shown in Figure 7 utilizes the same tubular body structure 99 as previously described, and essentially is very similar to the mounting shown in Figure 6. That portion of the mounting that is disposed interiorly of the body structure 99 comprises a pair of longitudinally extending, transversely arcuate metal side plates 132, 132 that abut the opposite walls of the tubular body structure and are united by a horizontal abutment plate 133 that is welded thereto at its opposite margins, said abutment plate being disposed substantially diametrically of said tubular body. Bonded to the side plates 132, above abutment plate 133, is a bridge-like rubber cushion structure 134 that in all respects is identical with cushion 105 of Figure 4, including a flanged bushing 135 molded therein. The abutment plate is apertured at 136 in alignment with apertures 100, 101 of the body 99, and with the bushing 135. The rebound cushion, designated 137, is essentially similar to that shown in Figure 6 except that its top metal plate 138 is transversely arcuate so as to conform to the transverse contour of the tubular body 99. Also the structure 137 is somewhat tapered toward its lower end. The mounting supports a stud 130 that is identical with that shown in Figure 6. The mounting operates in the same manner and has the same advantages as the mountings shown in Figures 4 to 6.

Turning now to the embodiment of the invention shown in Figure 8, it is seen that it corresponds to the form of the invention shown in Figures 1 to 3 and it utilizes the tubular body structure 99 having the aligned apertures 100, 101 therein of Figures 5, 6, and 7. A diametrically positioned abutment plate 140 having a central aperture 141 therein is secured in the structure 99 and a rubber body 142 is carried thereon, similarly to the body 94 in Figure 1. In this form of the invention a bushing 143 which is not threaded is embedded in the rubber body 142. Then a second rubber body 144, slightly smaller than the body 142, is received between, and usually vulcanized to, the flanges 145 of the abutment plate. The rubber body 144 carries a bushing 143a which is fixedly spaced from the bushing 143 by a sleeve 146. A stud, extending to the supported member (not shown), extends through the bushings 143, 143a and sleeve 146 and is secured in position by a nut 147, a washer 148 being interposed between the nut 147 and bushing 143a. Note that in addition to the advantages of the other embodiments of the invention, the present embodiment of the invention offers equal resistance to both bound and rebound of the supported member, whereby any movement thereof is rapidly dampened. This action is particularly desirable in airplanes.

It will be understood that the several structures shown in Figures 4 to 8, inclusive, include partitions (not shown) that are mounted within the tubular body structure, at each end of the mountings shown therein, so as to confine (and compress, if desired) the rubber cushions and more effectively to enable them to oppose lateral movement of the supporting studs in the direction of the axis of each tubular body structure.

In Figure 9, a modified bridge-like rubber structure 151 is shown. This rubber structure has ends 152 which are adapted to abut partitions in the confining structure therefor, but appreciable longitudinal movement of a bushing 153 carried by the rubber structure is made possible by forming recesses 154 in the ends of the structure. Note that the rubber structure has vertically extending sides to adapt the structure to be positioned in a hollow supporting member having planar sides, otherwise the rubber structure is similar to the rubber body 94. Of course, the desired freedom for longitudinal movement of the bushing 153 can be provided by making the rubber structure with any desired type of irregular end portion.

Other modification may be resorted to without departing from the spirit of the invention, or the scope thereof as defined by the appended claims.

What is claimed is:

1. A resilient mounting for use between two relatively movable members of which one member is a tubular metal member formed with an aperture in its wall, said mounting comprising an abutment plate extending substantially axially of the tubular structure in chordal relation thereto, interiorly thereof, a bridge-like rubber structure above said abutment plate having opposite marginal portions in engagement with opposite walls of the tubular structure, and a metallic insert mounted centrally in the rubber structure, in alignment with the aperture in the tubular structure, for engagement with a connection to the other relatively movable member.

2. A resilient mounting for use between two relatively movable members of which one member is a tubular metal structure formed with an aperture in its wall, said mounting comprising an abutment plate extending substantially axially of the tubular structure in chordal relation thereto, interiorly thereof, and formed with an aperture in axial alignment with the aperture in the tubular structure, a bridge-like rubber structure above said abutment plate having opposite lateral portions in engagement with opposite sides of the tubular structure, a tubular metal insert in the rubber structure co-axial with the apertures in the abutment plate and tubular structure, a stud connectable with the other relatively movable member that rests upon said metal insert, and has a reduced portion that extends therethrough and through the aperture in the abutment plate, and a yielding member engaging the lower end of the stud, below the abutment plate, and resisting retractive movement of the stud by reason of its resistance to compression.

3. A combination as defined in claim 2 in which the yielding member that opposes retractive movement of the stud is mounted upon the under side of the abutment plate.

4. A combination as defined in claim 2 in which the yielding member that opposes retractive movement of the stud is mounted upon the outer surface of the tubular structure and engages the stud through the agency of an aperture in said structure.

5. A resilient mounting for use between two relatively movable members of which one member is a tubular metal structure formed with axially aligned apertures at diametrically opposite points of its wall, said mounting comprising an abutment plate extending substantially axially of the tubular structure in chordal relation thereto, interiorly thereof, and formed with an aperture in alignment with the aforementioned apertures, said aperture being surrounded by an axially-extending flange on the abutment plate, a bridge-like rubber structure above said abutment plate having opposite lateral portions in engagement with opposite sides of the tubular structure, a tubular metal bushing extending through said rubber structure co-axial with the apertures in the tubular structure and the abutment plate, an axially apertured rubber cushion positioned below the abutment plate and having a portion extending into the aperture within the flange of said abutment plate, a stud connectable with the other relatively movable member, said stud resting upon the upper end of said sleeve and having a reduced portion extending therethrough and through the aperture of the lower rubber cushion, and means on the lower end of the stud for subjecting both rubber structures to axially directed compressive stress.

6. A resilient mounting for use between two relatively movable members of which one member is a tubular metal member formed with diametrically opposed apertures in its wall, said mounting comprising an abutment plate within and extending perpendicular to the axis of the apertures in and substantially axially of said tubular metal member in chordal relation thereto, said abutment plate having an aperture therein on the axis of the apertures in said tubular member, a bridge-like rubber structure having a hole therethrough carried above said abutment plate by engaging with the ends thereof, said bridge-like rubber structure having opposite marginal portions in engagement with opposite walls of said tubular member, a flanged metal plate on the outside of said tubular member with the flange thereon engaging with the aperture in said tubular member with which said bridge-like rubber structure is not adjacent, a rubber body associated with the outer portion of said flanged metal plate, and means extending through the apertures in said tubular member, said abutment plate and said bridge-like rubber structure and engaging with said rubber body and said bridge-like rubber structure for connecting to the other relatively movable member.

7. A resilient mounting for use between two relatively movable members, of which one member is a tubular metal member formed with diametrically opposed apertures in its wall, said mounting comprising an abutment plate extending substantially axially of, and, within said tubular metal member, chordal relation thereto and dividing same into two substantially similar sections, each of which has an aperture therein, said abutment plate having an aperture therein on the axis of the apertures in said tubular member, a bridge-like rubber structure having a hole therethrough carried above said abutment plate and having opposite marginal portions in engagement with opposite walls of said tubular member, a metal plate on the outside of said tubular member adjacent the aperture in said tubular member spaced from said bridge-like rubber structure, a rubber body associated with the outer portion of said metal plate, and means extending through the apertures in said tubular member, said abutment plate and said bridge-like rubber structure and engaging with said rubber body and said bridge-like rubber structure for connecting to the other relatively movable member.

8. A resilient mounting for use between two relatively movable members of which one member is a tubular metal member formed with an aperture in its wall, said mounting comprising an abutment plate having an aperture therein aligned with the aperture in said tubular member extending substantially axially of the tubular member in chordal relation thereto, interiorly thereof, a bridge-like rubber structure carried by said abutment plate and normally engaging said plate at the edges thereof, a metallic insert mounted centrally in the rubber structure in alignment with the aperture in the tubular member, and means engaging with the metallic insert and extending through the aperture in the tubular member whereby the other relatively movable member can be supported by the rubber structure which is flattened out thereby and brought into increased contact with the abutment plate.

9. A resilient mounting for use between two relatively movable members of which one member is a tubular metal member formed with an aperture in its wall, said mounting comprising an abutment plate having an aperture therein aligned with the aperture in said tubular member extending substantially axially of the tubular member in chordal relation thereto, interiorly thereof, bridge-like rubber means mounted in opposing relation on opposite sides of said abutment plate, and means for connecting the other relatively movable member to said bridge-like rubber means whereby said bridge-like rubber means dampen movement of the other relatively movable member.

10. A resilient mounting for use between two relatively movable members of which one member is a tubular metal member formed with an aperture in its wall, said mounting comprising an abutment plate having an aperture therein aligned with the aperture in said tubular member extending substantially axially of the tubular member in chordal relation thereto, interiorly thereof, a bridge-like rubber structure above said abutment plate having opposite marginal portions in engagement with opposite walls of the tubular member, a downwardly extending bridge-like rubber structure below said abutment plate having opposite marginal portions in engagement with opposite walls of the tubular member, tubular metallic inserts mounted centrally in the rubber structures in alignment with the apertures in the tubular member and abutment plate, means engaging with the metallic inserts to maintain them in a given spaced relation, and means extending through the aperture in the tubular member and engaging with said tubular metallic inserts whereby the other relatively movable member can be carried by the rubber structures and have movement thereof rapidly damped by the opposed rubber structures.

11. A resilient mounting for use between two relatively movable members, said mounting comprising a hollow supporting member having an aperture in its wall, an abutment plate extending substantially axially of and between the interior walls of said hollow supporting member, a bridge-like rubber structure supported by said abutment plate and having opposite marginal portions in engagement with opposite walls of said supporting member, and a metallic insert embedded in said rubber structure in alignment with the aperture in said supporting member for engagement with a connection to the other relatively movable member.

12. A resilient mounting as in claim 11 in which means are provided to confine the ends of the bridge-like rubber structure, and the bridge-like rubber structure is provided with irregular end portions to adapt it for slight longitudinal movement.

13. A resilient mounting for use between two relatively movable members of which one member is a tubular structure with an aperture in its wall, said mounting comprising an abutment plate extending substantially axially of said structure in chordal relation thereto, a bridge-like rubber structure having opposite marginal portions thereof in engagement with opposite walls of said tubular structure and said abutment plate, and an insert mounted centrally in said rubber structure for connecting the latter with the other relatively movable member, the surface of said rubber structure in contact with said plate being inclined toward the central portion thereof whereby a deflection of the central portion of said rubber structure toward said plate causes said rubber structure to contact said plate progressively from the opposite margins thereof toward the center.

CURT SAURER.